July 7, 1970 D. H. R. VILKOMERSON ET AL 3,519,996
RADIATION-SENSING MATRIX CIRCUIT
Filed Oct. 13, 1967
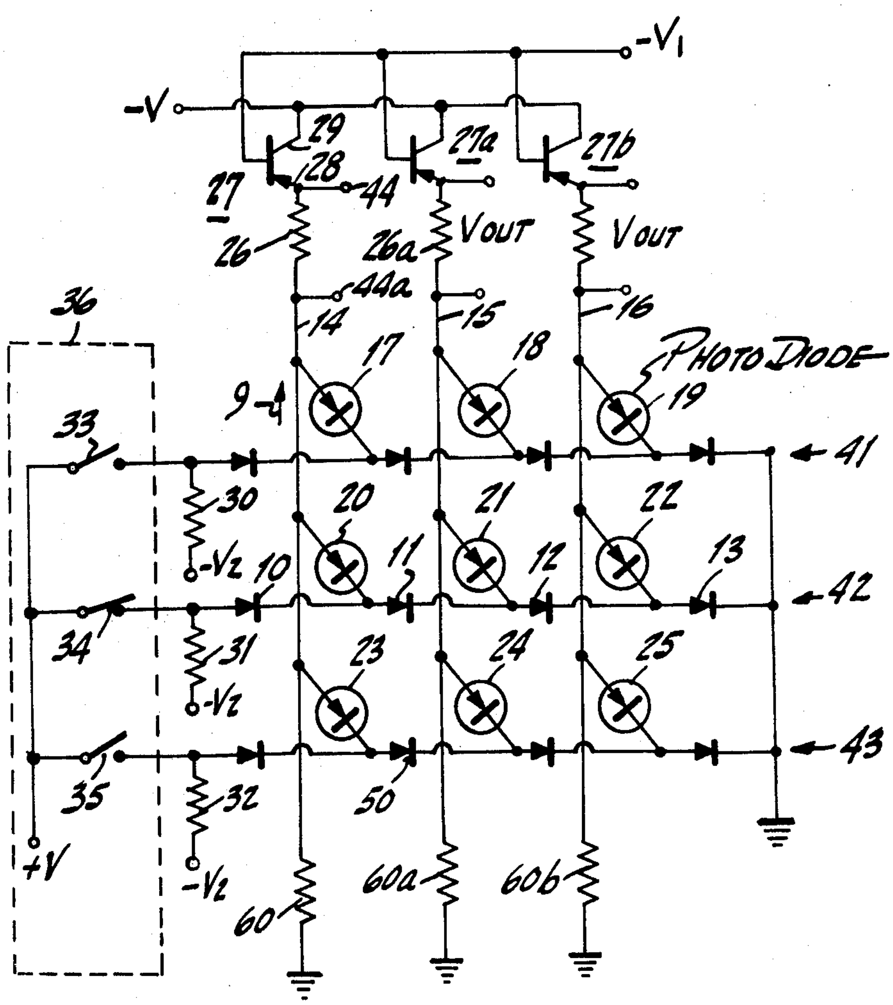
INVENTORS
Reuben S. Mezrich &
David H.R. Vilkomerson
BY Samuel Cohen
ATTORNEY United States Patent Office 3,519,996
Patented July 7, 1970

3,519,996

RADIATION-SENSING MATRIX CIRCUIT

David H. R. Vilkomerson, Princeton, and Reuben S. Mezrich, Hightstown, N.J., assignors to RCA Corporation, a corporation of Delaware Filed Oct. 13, 1967, Ser. No. 675,161
Int. Cl. H04q *3/00*
U.S. Cl. 340—166 6 Claims

ABSTRACT OF THE DISCLOSURE

An array of radiation-sensing elements useful, for example, for reading the information stored in an optical memory. Asymmetrically conducting coupling elements in the array permit the array to be operated a row at a time without excessive leakage through sneak paths of the currents it is desired to sense.

Background of the invention

In a number of applications, information in the form of radiation must be converted into electrical signals to permit this information to be processed as, for example, by a digital data processing machine. Image scanning devices, such as vidicons, image orthicons or the like or arrays of radiation-sensing elements, such as photo-conductors, photo-transistors, photo-diodes, or the like, may be employed for this purpose. The present application deals with the latter class of system—an array of radiation-sensing elements, which can be operated at relatively high speed and which also readily can be integrated. This array is particularly suitable for use with the hologram read-only memory described in copending application entitled, Hologram Memory System, Ser. No. 515,-531, filed Dec. 22, 1965 by the present inventors and C. M. Wine and assigned to the assignee of the present application.

Summary of the invention

The radiation-sensing circuit of the invention includes a plurality of rows of asymmetrically conducting coupling elements, the elements in each row being connected in series in the same conducting direction. The circuit also includes a plurality of column conductors and a plurality of radiation-sensing devices, each device connected between a column conductor and the connection between two adjacent coupling elements in a row.

Brief description of the drawing

The sole figure is a circuit diagram of a preferred form of the present invention.

Detailed description

The circuit of the figure includes a plurality of rows of asymmetrically conducting coupling elements, such as conventional switching diodes. In the example chosen for illustration, there are four such diodes, such as 10, 11, 12 and 13, per row, connected in series anode-to-cathode. The array also includes column conductors 14, 15 and 16 and there is a radiation-sensing device—a photo-diode, connected between each column conductor and the anode-to-cathode connection between two coupling diodes in a row. Again, for purposes of illustration, nine such photo-diodes 17–25 are shown. In practice, the matrix may have many more columns and rows than shown and may include many more radiation-sensing elements and many more coupling diodes than shown.

There is a current-sensing circuit connected to each column of the array. Each such circuit includes a load resistor such as 26, a transistor such as 27, the emitter 28-to-collector 29 path of which is connected essentially in series with the column conductor. The collectors of the transistors are maintained at a voltage of —V volts and the bases of the transistors are connected to a source of forward bias voltage $-V_1$, where —V is more negative than $-V_1$.

The rows of the matrix normally are connected through respective resistors 30, 31 and 32 to a source of reverse bias voltage $-V_2$. The rows of the matrix are also connected through switches 33, 34 and 35, respectively, to a source of voltage +V. For purposes of illustration, the switches are shown to be mechanical switches, however, in practice, they may be electronic switches such as transistors, diodes or the like. Further, the entire group of switches shown within dashed block 36 may be operated as a scanner, by closing and then opening the switches connected to successive rows in successive fashion—only one switch being closed at a time.

The nine photo-diodes 17–25 are located in positions corresponding to nine memory locations of an optical memory. When this optical memory is read out, it either supplies a light output at a particular location, corresponding, for example, to storage of the binary digit (bit) "1" or no light output, corresponding to storage of the bit "0." All nine such memory locations are read out at the same time. In practice, rather than only nine bits, there may be several thousand or tens of thousands of bits which are read out concurrently and it is generally desired that smaller numbers of such bits at a time be handled by the data processing machine. Therefore, the matrix of the present invention is operated a row at a time.

For purposes of illustration, switch 34 is shown closed and switches 33 and 35 are shown open so that the switching diodes in row 42 are forward biased by the source +V and the switching diodes in the rows 41 and 43 are reverse biased by the source $-V_2$. This corresponds to the read out of the second row 42 of the matrix. Assume now that light from the memory is illuminating photo-diode 20 but photo-diodes 21 and 22 remain dark. When the photo-diode 20 is illuminated, it acts as a current source and supplies current to column 14 in the direction of arrow 9 (conventional flow from plus to minus is assumed). Current now flows from the anode of the photo-diode 20 through resistor 26 and the emitter 28-to-collector 29 path of transistor 27 to the negative power supply terminal legended —V. The return path for this current is through the positive power supply terminal +V, through switch 34 and through diode 10 to the cathode of photo-diode 20. An output voltage indicative of this flow of current is produced across resistor 26 and is available at output terminals 44, **44*a***.

The remaining transistors **27*a* and 27*b* are in condition to conduct but they do not conduct any appreciable current. One reason is that the photo-diodes 21 and 22 are not illuminated and act as extremely high values of resistance in series with the emitter-to-collector paths of transistors 27*a* and 27*b*. Any output voltage which does develop due to current flow through, for example, transistor 27*a*, is not significant because of the small amount of current flow and because the major part of such voltage would develop across the photo-diode rather than across the resistor 26*a*. There is a second path for current flow through a resistor such as 60*a* to ground. However, this resistor is much larger (at least ten times larger) than the output resistor such as 26*a*, and limits the current flow through the transistor. Further, any voltage which develops due to such current flow appears principally across the resistor 60 and insignificantly across resistor 26*a***.

There is the possibility of sneak paths in the circuit of the invention, however, the amount of current which flows in these sneak paths is insignificant. For example, assume the photo-diodes 23 and 24 in the non-selected row 43 are illuminated. It becomes possible for the current generated by one of these diodes to flow through the circuit which includes switch 34, coupling diode 10, illuminated diode 20, illuminated diode 23, coupling diode 50 and illuminated diode 24 to column 15 and the current-sensing circuit of column 15. However, analysis shows, and this has been borne out in practice, that this sneak path is of much, much higher impedance than the desired path, namely the path through transistor 27. The controlling factor which contributes to this property of the circuit is the capacitive reactance exhibited by the circuit elements at their operating frequency.

In more detail, the sneak path discussed above has an additional coupling diode 50 in series therewith and the internal capacitance of this coupling diode is lower than (and its capacitive reactance correspondingly higher than) that of the photo-diode 20. In practice, the switching diode's capacitance may be made one one-hundredth or less that of the photo-diode by reducing the size of its junction, by changing the doping or by other means, and a signal-to-spurious current ratio of 50 or more readily can be obtained.

While not meant to be limiting, an array according to the invention made up of discrete circuit elements may have the following parameters:

| | |
|---|---|
| Voltages: | |
| $-V$ | $-22$ volts. |
| $-V_1$ | $-13$ volts. |
| $-V_2$ | $-5$ volts. |
| $+V$ | $+3$ volts. |
| Transistors | Type 2N769. |
| Photo-diodes | Type HPA 4507. |
| Coupling diodes | Type HPA 1006. |

It should also be mentioned that the matrix of the invention is particularly suitable for integration. There are a number of reasons. One is that the matrix can have a regular design. Another is that only two terminal elements (switching diodes and photo-diodes) are employed in the matrix itself and these are relatively easy to integrate. Finally, the topography is such that step and repeat fabrication techniques readily may be employed.

While the invention is illustrated as a regular 3 x 3 array of elements, it is to be understood that it is also possible to use matrices of other configurations. These may be employed as special types of decoding and other circuits.

What is claimed is:

1. In a light-sensing circuit, in combination:

a plurality of rows of coupling diodes, the diodes in each row being connected in series anode-to-cathode;

a plurality of column conductors; and a plurality of photo-diodes, each connected between a column conductor and the anode-to-cathode connection of two adjacent coupling diodes in a row.

2. In a light-sensing circuit as set forth in claim 1, said coupling diodes exhibiting a substantially higher capacitive reactance than said photo-diodes.

3. In a radiation-sensing circuit, in combination:

a plurality of rows of asymmetrically conducting coupling elements, the elements in each row being connected in series in the same conducting direction;

a plurality of column conductors; and a plurality of radiation-sensitive devices, each connected between a column conductor and the connection between two adjacent coupling elements in a row.

4. In a radiation-sensing circuit, in combination:

a plurality of rows of asymmetrically conducting coupling elements, the elements in each row being connected in series in the same conducting direction;

a plurality of column conductors;

a plurality of radiation-sensitive devices, each connected between a column conductor and the connection between two adjacent coupling elements in a row; and a plurality of current-sensing circuits, each connected to a different column conductor, each such circuit including an amplifying device connected to a column conductor, in the forward direction relative to the current which can be produced by a radiation-sensitive device connected to that column, and means connected between a selected row and said amplifying device for supplying operating voltage to said amplifying device, through at least one coupling diode in a row and one radiation-sensitive device connected between that row and said column conductor.

5. In a circuit as set forth in claim 4, each such current-sensing circuit including a transistor connected at one of its emitters and collector electrodes to a column and at the other said electrode to said means for supplying operating voltage.

6. In a circuit as set forth in claim 5, each such coupling element comprising a coupling diode, and each such radiation-sensitive device comprising a photo-diode.

References Cited

UNITED STATES PATENTS 3,125,681 3/1964 Johnson.

HAROLD I. PITTS, Primary Examiner

U.S. Cl. X.R.

340—147, 149, 176; 250—213